United States Patent [19]

Doerge et al.

[11] Patent Number: 5,397,808
[45] Date of Patent: Mar. 14, 1995

[54] LOW THERMAL CONDUCTIVITY FOAM

[75] Inventors: Herman P. Doerge, Pittsburgh; Joseph M. Sutej, New Brighton, both of Pa.; Edward E. Ball, Weirton, W. Va.; John F. Szabat, Pittsburgh, Pa.

[73] Assignee: Miles Inc., Pittsburgh, Pa.

[21] Appl. No.: 241,885

[22] Filed: May 12, 1994

[51] Int. Cl.$^6$ .......................... C08J 9/14; C08G 18/06
[52] U.S. Cl. ........................................ 521/99; 521/131
[58] Field of Search .................................. 521/99, 131

[56] References Cited

U.S. PATENT DOCUMENTS

| | | | |
|---|---|---|---|
| 4,795,763 | 1/1989 | Gluck et al | 521/99 |
| 4,972,002 | 11/1990 | Volkert | 521/120 |
| 4,981,879 | 1/1991 | Snider | 521/131 |
| 5,034,424 | 7/1991 | Wenning et al. | 521/109.1 |
| 5,114,986 | 5/1992 | Lui | 521/131 |
| 5,137,930 | 8/1992 | Soukup | 521/99 |
| 5,162,384 | 11/1992 | Owens et al. | 521/110 |
| 5,187,206 | 2/1993 | Volkert et al. | 521/129 |
| 5,254,601 | 10/1993 | Doerge | 521/131 |
| 5,318,996 | 6/1994 | Ya-Hallada et al. | 521/131 |

*Primary Examiner*—Morton Foelak
*Attorney, Agent, or Firm*—Joseph C. Gil

[57] ABSTRACT

The present invention is directed to the discovery that a specific combination of HCFC-141b, certain perfluorinated compounds and carbon black significantly improve the insulating capacity of isocyanate-based foams when compared to foams made without all three ingredients.

2 Claims, No Drawings

LOW THERMAL CONDUCTIVITY FOAM

BACKGROUND OF THE INVENTION

Rigid polyurethane foams and processes for their production are well known in the art. Such foams are typically produced by reacting a polyisocyanate with an isocyanate-reactive material such as a polyol in the presence of a chlorofluorocarbon blowing agent. It is also known, however, that these chlorofluorocarbon blowing agents pose environmental problems.

Alternatives to the known chlorofluorocarbon blowing agents are currently the subject of much research. Hydrogen chlorofluorocarbons (HCFC) are among the most promising alternatives. However, some HCFCs must be used in larger amounts than the traditional chlorofluorocarbons and often result in foams having thinner cell walls. The HCFCs also tend to migrate from foam cell cavities thereby reducing the insulation value of the foam. Further, HCFCs produce a more thermally conductive foam insulation which reduces the energy efficiency of appliances, e.g., which are insulated with such foams. Consequently, substitution of HCFCs for the traditional chlorofluorocarbons may resolve the environmental problems created by chlorofluorocarbons but it creates an energy efficiency problem.

Dichlorofluoroethane ("HCFC-141b") has been described as being useful as a blowing agent for rigid isocyanate-based foams (see U.S. Pat. No. 5,254,601). Perfluorinated aliphatic hydrocarbons, perfluorinated cycloaliphatic hydrocarbons and perfluorinated ethers have also been described as being useful as blowing agents for rigid isocyanate-based foams alone and in combination with other blowing agents (U.S. Pat. Nos. 4,972,002 and 5,034,424). Perfluorinated N-aliphatic, cyclic 1,3- and 1,4aminoethers (U.S. Pat. No. 5,162,384) and perfluorinated tertiary alkylamines (U.S. Pat. No. 5,187,206) are also described as being useful as blowing agents alone and in combination with other blowing agents. Finally, perfluorinated hydrocarbons have been described as being useful in improving the insulating capacity of foams (U.S. Pat. No. 4,981,879).

It has also been suggested that carbon black can improve the thermal insulating properties of rigid isocyanate-based foams (see U.S. Pat. Nos. 4,795,763 and 5,137,930).

DESCRIPTION OF THE INVENTION

The present invention is directed to the discovery that a specific combination of HCFC-141b, certain perfluorinated compounds and carbon black significantly improve the insulating capacity of isocyanate-based foams when compared to foams made without all three ingredients. More particularly, the present invention is directed to a closed cell, rigid polymer foam which comprises the reaction product of a polyisocyanate and an isocyanate-reactive compound in the presence of a) from 5.0 to 20.0% by weight (and preferably from 8 to 17% by weight) of dichlorofluoroethane, b) from 0.1 to 5.0% by weight (and preferably from I to 3 % by weight) of a fluorinated blowing agent selected from the group consisting of i) perfluorinated aliphatic and cycloaliphatic hydrocarbons, ii) perfluorinated N-aliphatic, cyclic 1,3-or 1,4- amino ethers, iii) perfluorinated ethers, iv) perfluorinated tertiary alkylamines, and c) from 0.1 to 12% by weight (and preferably from 4 to 8% by weight) of carbon black, with all of the percents by weight being based upon the total weight of the foam.

Dichlorofluoroethane is known and is commercially available.

Perfluorinated aliphatic hydrocarbons, perfluorinated cycloaliphatic hydrocarbons and perfluorinated ethers are known and described in U.S. Pat. Nos. 4,972,002, 4,981,879 and 5,034,424, the disclosures which are hereby incorporated by reference. Useful perfluorinated materials of these types include commercially available materials such as the Fluorinert liquids available from the 3M Company and the Multifluor Inert liquids available from Air Products. Also useful are such materials as perfluoropropane, perfluorobutane, perfluorocyclobutane, perfluoropentane, perfluorohexane, perfluoroheptane, perfluorooctane, perfluorocyclopentane, perfluorocyclohexane, perfluoro-2-methyl pentane, polyoxyperfluoroalkanes (such as $CF_3(OC_3F_6)$), and the like.

Perfluorinated N-aliphatic, cyclic 1,3- and 1,4- aminoethers are known and described in U.S. Pat. No. 5,162,384, the disclosure which is hereby incorporated by reference.

Perfluorinated tertiary alkylamines are known and described in U.S. Pat. No. 5,187,206, the disclosure which is hereby incorporated by reference. Useful materials of this type include perfluorodimethylethylamine, perfluorodiethylmethylamine, perfluorotrimethylamine, perfluorodiethyl-n-propylamine, perfluorotri-n-propylamine, perfluorodimethylisopropylamine, and the like.

Both the HCFC-141b and the perfluorinated compound are preferably mixed with the isocyanate-reactive compound.

The carbon black may be any of the different kinds available, such as lampblack, channel black, gas furnace black, oil furnace black and thermal black. Although both fluffy and pelleted types of carbon black may be used, the pelleted carbon blacks have been found particularly suitable for large scale processing. Further details of the types of carbon blacks useful herein can be found in U.S. Pat. Nos. 4,795,763 and 5,137,930, the disclosures which are hereby incorporated by reference. Particularly preferred commercially available carbon blacks are pelleted carbon blacks sold by Columbian Chemicals Company under the names Raven 410 and Raven 430, and sold by Cabot Corporation under the name Black Pearl 280. The carbon black can be added to either the polyisocyanate or the isocyanate-reactive compound.

As is known in the art, rigid foams are prepared by reacting polyisocyanates with isocyanate-reactive compounds. Any of the known organic polyisocyanates may be used in the present invention. Suitable polyisocyanates include: aromatic, aliphatic and cycloaliphatic polyisocyanates and combinations thereof. Representative of these types are diisocyanates such as m-or p-phenylene diisocyanate, toluene-2,4-diisocyanate, toluene-2,6-diisocyanate, hexamethylene-1,6-diisocyanate, tetramethylene-1,4-diisocyanate, cyclohexane, 1,4diisocyanate, hexahydrotoluene diisocyanate (and isomers), naphthylene-1,5-diisocyanate, 1-methylphenyl-2,4-phenyl diisocyanate, diphenylmethane-4,4'- diisocyanate, diphenylmethane-2,4'-diisocyanate, 4,4'biphenylene diisocyanate, 3,3'-methoxy-4,4'-biphenylene diisocyanate and 3,3'-dimethyldiphenylpropane-4,4'-diisocyanate; triisocyanates such as toluene-2,4,6-triisocyanate and polyisocyanates such as 4,4'-dimethyldiphenyl-methane-2,2',5,5'-tetraisocyanate and the diverse polymethylenepolyphenylpolyisocyanates.

A crude polyisocyanate may also be used in making polyurethanes, such as the crude toluene diisocyanate obtained by the phosgenation of a mixture of toluene diamines or the crude diphenyl-methane diisocyanate obtained by the phosgenation of crude diphenyl-methanediamine. The preferred undistilled or crude polyisocyanates are disclosed in U.S. Pat. No. 3,215,652, incorporated by reference.

Especially preferred for making rigid polyurethanes are methylene-bridged polyphenyl polyisocyanates and prepolymers of methylene-bridged polyphenyl polyisocyanates, having an average functionality of from about 1.8 to about 3.5, preferably about 2.0 to about 3.1 isocyanate moieties per molecule and an NCO content of from about 28 to about 34% by weight, due to their ability to cross-link the polyurethane. The isocyanate index (ratio of equivalents of isocyanates to equivalents of active hydrogen-containing groups) is advantageously from about 0.9 to about 3.0, preferably about 1.0 to about 2.0 and most preferably from about 1.0 to about 1.5.

Any of the known organic compounds but preferably polyols containing at least two isocyanate-reactive hydrogen atoms and having a hydroxyl (OH) number of from about 200 to about 650, preferably from about 400 to about 500, may be employed in the present invention.

Suitable high functionality, high molecular weight polyols may be prepared by reacting a suitable initiator containing active hydrogens with alkylene oxide. Suitable initiators are those containing at least 4 active hydrogens or combinations of initiators where the mole average of active hydrogens is at least 4, preferably from about 4 to about 8, and more preferably from about 6 to about 8. Active hydrogens are defined as those hydrogens which are observed in the well-known Zerewitinoff test, see Kohler, Journal of the American Chemical Society, p. 3181, Vol. 49 (1927). Representative of such active hydrogen-containing groups include —OH, —COOH, —SH and —NHR where R is H or alkyl, aryl aromatic group and the like.

Examples of suitable initiators include pentaerythritol, carbohydrate compounds such as lactose, α-methylglucoside, α-hydroxyethylglucoside, hexitol, heptitol, sorbitol, dextrose, mannitol, sucrose and the like. Examples of suitable aromatic initiators containing at least four active hydrogens include aromatic amines such as toluene diamine, particularly meta-toluene diamine and methane diphenylamine, the reaction product of a phenol with formaldehyde, and the reaction product of a phenol with formaldehyde and a dialkanolamine such as described by U.S. Pat. Nos. 3,297,597; 4,137,265 and 4,383,102 (incorporated herein by reference). Other suitable initiators which may be used in combination with the initiators containing at least four active hydrogens include water, glycerine, trimethylolpropane, hexane triol, aminoethylpiperazine and the like. These initiators may contain less than four active hydrogens and therefore can only be employed in quantities such that the total mole average of active hydrogens per molecule remains at least about 3.5 or more. Particularly preferred initiators for the preparation of the high functionality, high molecular weight polyols comprise sucrose, dextrose, sorbitol, α-methylglucoside, α-hydroxy-ethylglucoside which may be employed separately or in combination with other initiators such as glycerine or water.

The polyols may be prepared by methods well-known in the art such as taught by Wurtz, The Encyclopaedia of Chemical Technology, Vol. 7, p. 257–266, Interscience Publishers Inc. (1951) and U.S. Pat. No. 1,922,459. For example polyols can be prepared by reacting, in the presence of an oxyalkylation catalyst, the initiator with an alkylene oxide. A wide variety of oxyalkylation catalysts may be employed, if desired, to promote the reaction between the initiator and the alkylene oxide. Suitable catalysts include those described in U.S. Pat. Nos. 3,393,243 and 4,595,743, incorporated herein by reference. However, it is preferred to use as a catalyst a basic compound such as an alkali metal hydroxide, e.g., sodium or potassium hydroxide, or a tertiary amine such as trimethylamine. The reaction is usually carried out at a temperature of about 60° C. to about 160° C., and is allowed to proceed using such a proportion of alkylene oxide to initiator so as to obtain a polyol having a hydroxyl number ranging from about 200 to about 650, preferably about 300 to about 550, most preferably from about 350 to about 500. The hydroxyl number range of from about 200 to about 650 corresponds to an equivalent weight range of about 86 to about 280.

Polyols of a higher hydroxyl number than 650 may be used as optional ingredients in the process of the present invention. Amine-based polyols having OH values greater than 650, preferably greater than 700 are particularly useful as optional ingredients.

The alkylene oxides which may be used in the preparation of the polyol include any compound having a cyclic ether group, preferably an α,β-oxirane, and are unsubstituted or alternatively substituted with inert groups which do not chemically react under the conditions encountered whilst preparing a polyol. Examples of suitable alkylene oxides include ethylene oxide, propylene oxide, 1,2- or 2,3-butylene oxide, the various isomers of hexane oxide, styrene oxide, epichlorohydrin, epoxychlorohexane, epoxychloropentane and the like. Most preferred, on the basis of performance, availability and cost are ethylene oxide, propylene oxide, butylene oxide and mixtures thereof, with ethylene oxide, propylene oxide, or mixtures thereof being most preferred. When polyols are prepared with combinations of alkylene oxides, the alkylene oxides may be reacted as a complete mixture providing a random distribution of oxyalkylene units within the oxide chain of the polyol or alternatively they may be reacted in a step-wise manner so as to provide a block distribution within the oxyalkylene chain of the polyol.

Such polyols include a sucrose-initiated polyol propoxylated to an average hydroxyl number of from about 400 to about 500, a sorbitol-initiated polyol propoxylated to an average hydroxyl number of about 250 to about 290, a sorbitol-glycerine initiated polyol having nominally an average of about 4.0 to about 4.4 active hydrogens and propoxylated to a hydroxyl number of about 250 to about 290.

The polyol is used in a quantity sufficient to allow the preparation of low friability, good dimensionally stable and strong foams.

Suitable optional polyols include polyether polyols, polyester polyols, polyhydroxy-terminated acetal resins, hydroxy-terminated amines and polyamines. Examples of these and other suitable materials are described more fully in U.S. Pat. No. 4,394,491, particularly in columns 3 to 5 thereof. Most preferred for preparing rigid foams are those having from about 2 to about 8, preferably from about 3 to about 8 active hydrogens and having a hydroxyl number from about 50 to about 800, preferably from about 200 to about 650, and more preferably from about 300 to about 550. Examples of such polyols include those commercially available under the product names Terate (available from Cape Industries) and Multranol (available from Miles Inc.).

Other components useful in producing the polyurethanes of the present invention include surfactants, pigments, colorants, fillers, antioxidants, flame retardants, stabilizers, and the like.

When preparing polyisocyanate-based foams, it is generally advantageous to employ a minor amount of a surfactant to stabilize the foaming reaction mixture until it obtains rigidity. Such surfactants advantageously comprise a liquid or solid organosilicon compound. Other, less preferred surfactants include polyethylene glycol ethers of long chain alcohols, tertiary amine or alkanolamine salts of long chain alkyl acid sulfate esters, alkylsulfonic esters, alkylarylsulfonic acids. Such surfactants are employed in amounts sufficient to stabilize the foaming reaction mixture against collapse and the formation of large, and uneven cells. Typically, about 0.2 to about 5.0 pads of the surfactant per 100 pads per weight polyol composition are sufficient for this purpose.

One or more catalysts are advantageously used. Any suitable urethane catalyst may be used including the known tertiary amine compounds and organometallic compounds. Examples of suitable tertiary amine catalysts include triethylenediamine, N-methylmorpholine, pentamethyldiethylenetriamine, dimethylcyclohexylamine, tetramethylethylenediamine, 1-methyl-4-dimethylaminoethyl-piperazine, 3-methoxy-N-dimethylpropylamine, N-ethylmorpholine, diethylethanolamine, N-cocomorpholine, N,N-dimethyl-N',N'dimethylisopropylpropylene diamine, N,N-diethyl-3-diethyl aminopropyl amine and dimethyl-benzyl amine. Examples of suitable organometallic catalysts include organomercury, organolead, organoferric and organotin catalysts, with organotin catalysts being preferred. Suitable organotin catalysts include tin salts of carboxylic acids such as dibutyltin di-2-ethyl hexanoate and dibutyltin dilaurate. Metal salts such as stannous chloride can also function as catalysts for the urethane reaction. A catalyst for the trimerization of polyisocyanates, such as an alkali metal alkoxide or carboxylate, may also optionally be employed herein. Such catalysts are used in an amount which measurably increases the rate of reaction of the polyisocyanate. Typical amounts are about 0.01 to about 1 pad of catalyst per 100 pads by weight of polyol.

The components described may be employed to produce rigid polyurethane and polyurethane-modified isocyanurate foam. The rigid foams of the present invention may be made in a one-step process by reacting all of the ingredients together at once, or foams can be made by the so-called "quasi prepolymer" method. In the one-shot process where foaming is carried out using machines, the active hydrogen containing compounds, catalyst, surfactants, blowing agents and optional additives may be introduced separately to the mixing head where they are combined with the polyisocyanate to give the polyurethane-forming mixture. The mixture may be poured or injected into a suitable container or molded as required. For use of machines with a limited number of component lines into the mixing head, a premix of all the components except the polyisocyanate can be advantageously employed. This simplifies the metering and mixing of the reacting components at the time the polyurethane-forming mixture is prepared.

Alternatively, the foams may be prepared by the so-called "quasi prepolymer" method. In this method a portion of the polyol component is reacted in the absence of catalysts with the polyisocyanate component in proportion so as to provide from about 10 percent to about 30 percent of free isocyanate groups in the reaction product based on the prepolymer. To prepare foam, the remaining portion of the polyol is added and the components are allowed to react together in the presence of catalysts and other appropriate additives such as blowing agent, surfactant, etc. Other additives may be added to either the prepolymer or remaining polyol or both prior to the mixing of the components, whereby at the end of the reaction a rigid polyurethane foam is provided.

The polyurethane foams of this invention are useful in a wide range of applications. Accordingly, not only can rigid appliance foam be prepared but spray insulation rigid insulating board stock, laminates and many other types of rigid foam can easily be prepared according to this invention.

The following Examples are given as being illustrative thereof. All parts and percentages given in these Examples are parts by weight and percentages by weight, unless otherwise indicated.

EXAMPLES

The materials used in the Examples given below were as follows:

POLYOL A: a blend of i) 82 parts by weight of an adduct of m-tolylene diamine, ethylene oxide and propylene oxide (weight ratio of EO:PO of about 0.85:1) having an OH number of about 460 and ii) 18 parts by weight of a glycerin/propylene oxide adduct having an OH number of about 470.

POLYOL B: a sucrose/propylene glycol/ethylene oxide/propylene oxide adduct (weight ratio of EO:PO of about 0.43:1) having an OH number of about 470.

POLYOL C: an ethylene diamine/propylene oxide adduct having an OH number of about 770.

POLYOL D: Stepanol PS-2502A, an aromatic polyester polyol having an OH number of about 240, commercially available from Stepan Company.

SURF A: a surfactant commercially available from Air Products and Chemicals Inc. under the name DC-5454.

SURF B: a silicone surfactant commercially available from OSi Specialities under the name L-5340.

SURF C: a surfactant commercially available from Air Products and Chemicals Inc. under the name DC-5357.

CAT A: a dimethylcyclohexylamine amine catalyst commercially available from Air Products and Chemicals, Inc. under the name Polycat 8.

CAT B: dibutyltin dilaurate.

CAT C: a strongly basic, amber-brown liquid having a characteristic amine odor commercially available from Air Products and Chemicals, Inc. under the name Polycat 41.

CAT D: N,N,N',N'-tetramethyl hexamethylene diamine

141B: dichlorofluoroethane.
PFNM: perfluoro-N-methyl morpholine
PFH: perfluorohexane.
CB1: Carbon black commercially available from Cabot Corporation under the name Black Pearl 280.
CB2: Carbon black commercially available from Columbian Chemical Company under the name Raven 410.
CB3: Carbon black commercially available from Columbian Chemical Company under the name Raven 430.
ISO A: an isocyante having an NCO group content of about 34% by weight, prepared by reacting toluene diisocyanate with a sucrose/propylene glycol/propylene oxide adduct having an OH number of about 380; ISO A also contains 1% by weight of SURF B;
ISO B: Mondur MR isocyanate, a commercially available polymethylene polyphenyl polyisocyanate from Miles Inc., having an NCO content of about 31%.

The ingredients noted under the heading "B-side" in Table 1 were mixed together. The ingredients noted under the heading "A-side" were also mixed together. The amounts of materials used were as indicated in Table 1 (all pads are pads by weight unless otherwise indicated).

The temperature of the B-side was maintained at 20° C. The temperature of the A-side was 20° C. for those A-sides where no carbon black was added to the A-side and was 28° C. for those A-sides where carbon black was added to the A-side. The reactivities were determined by mixing the two sides together for about 4 to 8 seconds and pouring the mixture into a one gallon paper container. The cream time ("CT"), gel time ("GT") and tack-free time ("TFT") were then measured.

Molded panels were prepared using the following procedure. The B-side was cooled to 15° C. The temperature of the A-side was 15° C. for those A-sides where no carbon black was added to the A-side and was 28° C. for those A-sides where carbon black was added to the A-side. The A-side was added to the B-side and mixed with an electrical stirrer for about 5 seconds. The mixture was then poured into an open top 63.5 cm by 33.02 cm by 5.08 cm metal mold which had been heated to about 49° C. The minimum fill density was determined. Another panel was prepared in the mold at an additional 10% packing over the minimum fill density. This "packed" panel was then used to determine the core K-factors and densities reported in Table 1.

TABLE I

| | Example | | | | | | | | |
|---|---|---|---|---|---|---|---|---|---|
| | 1 | 2 | 3 | 4 | 5 | 6 | 7 | 8 | 9 |
| B-Side | | | | | | | | | |
| Polyol A | 72.22 | 72.22 | 70.35 | 72.22 | 67.05 | 68.6 | 69.2 | 68.6 | 68.6 |
| Polyol B | | | | | | | | | |
| Polyol C | | | | | | | | | |
| Polyol D | | | | | | | | | |
| Surf A | | | | | 1.51 | 1.5 | 1.51 | 1.5 | 1.5 |
| Surf B | 0.36 | 0.36 | 0.36 | 0.36 | | | | | |
| Surf C | | | | | | | | | |
| Cat A | 1.38 | 1.38 | 1.38 | 1.38 | 1.27 | 1.26 | 1.27 | 1.26 | 1.26 |
| Cat B | 0.16 | 0.16 | 0.16 | 0.16 | 0.12 | 0.12 | 0.12 | 0.12 | 0.12 |
| Cat C | | | | | 0.71 | 0.7 | 0.71 | 0.7 | 0.7 |
| Cat D | | | | | | | | | |
| 141B | 25.27 | 25.27 | 27.1 | 25.27 | 29 | 28.75 | 29.01 | 28.75 | 28.75 |
| PFNM | | | | | | | 3.5 | 3.5 | |
| PFH | | | | 3.6 | | | | | 3.5 |
| Water | 0.61 | 0.61 | 0.65 | 0.61 | 0.34 | 0.34 | 0.34 | 0.34 | 0.34 |
| CB2 | | | | | | 9.35 | 9.44 | 9.35 | |
| CB3 | | | | | | | | | 9.35 |
| TOTAL | 100 | 100 | 100 | 103.6 | 100 | 110.62 | 115.1 | 114.12 | 114.12 |
| A-Side | | | | | | | | | |
| ISO A | 87 | 89.35 | 87.65 | 89.35 | 87.47 | 87.72 | 87.49 | 87.72 | 87.72 |
| ISO B | | | | | | | | | |
| CB1 | | 13 | 12.75 | 13 | | | | | |
| CT/GT/TFT Seconds | 15/33/110 | 10/35/65 | 10/38/63 | 10/37/63 | 9/30/63 | 11/29/60 | 8/32/60 | 8/30/53 | 9/33/60 |
| Density PCF | 1.96 | 2.22 | 2.15 | 2.14 | 1.76 | 1.93 | 1.86 | 2.02 | 2.04 |
| K-Factor Btu.in hr.ft$^2$-F.° | 0.126 | 0.114 | 0.116 | 0.109 | 0.122 | 0.115 | 0.111 | 0.111 | 0.111 |

TABLE II

| | Example | | | | | | | | |
|---|---|---|---|---|---|---|---|---|---|
| | 10 | 11 | 12 | 13 | 14 | 15 | 16 | 17 | 18 |
| B-Side | | | | | | | | | |
| Polyol A | 66.45 | 67.05 | 69.91 | 69.91 | | | | | |
| Polyol B | | | | | 33.63 | 33.52 | 33.63 | 33.63 | 33.52 |
| Polyol C | | | | | 9.69 | 10.25 | 9.69 | 9.69 | 10.25 |
| Polyol D | | | | | 21.34 | 22.54 | 21.34 | 21.34 | 22.54 |
| Surf A | 1.5 | 1.51 | 0.51 | 0.5 | | | | | |
| Surf B | | | | | | | | | |
| Surf C | | | | | 2.1 | 2.1 | 2.1 | 2.1 | 2.1 |
| Cat A | 1.26 | 1.27 | 1.28 | 1.28 | | | | | |
| Cat B | 0.12 | 0.12 | 0.12 | 0.12 | | | | | |

TABLE II-continued

| | Example | | | | | | | | |
|---|---|---|---|---|---|---|---|---|---|
| | 10 | 11 | 12 | 13 | 14 | 15 | 16 | 17 | 18 |
| Cat C | 0.7 | 0.71 | 0.71 | 0.71 | 0.6 | 0.6 | 0.6 | 0.53 | 0.53 |
| Cat D | | | | | 1.05 | 1.05 | 1.05 | 1.05 | 1.05 |
| 141B | 28.75 | 29 | 29.3 | 29.3 | 30.97 | 27.39 | 30.97 | 31.04 | 27.46 |
| PFNM | | | | 3.5 | | | | | |
| PFH | | 3.5 | | | | | | 4 | 4 |
| Water | 0.34 | 0.34 | 0.35 | 0.35 | 0.62 | 0.55 | 0.62 | 0.62 | 0.56 |
| CB2 | | | 9.53 | 9.53 | | | | | |
| CB3 | | | | | | | | | |
| TOTAL A-Side | 99.12 | 103.5 | 111.71 | 115.2 | 100 | 98 | 100 | 104 | 102 |
| ISO A | 89.49 | 90.36 | 88.38 | 88.34 | | | | | |
| ISO B | | | | | 105.34 | 109.1 | 105.34 | 105.34 | 109.1 |
| CB1 | 13.01 | 13.14 | | | | | | | |
| CB2 | | | | | 14.36 | 14.88 | 14.36 | 14.36 | 14.88 |
| CT/GT/FT Seconds | NT | NT | 9/32/64 | NT | 8/35/37 | 8/35/39 | NT | 3/32/50 | 3/32/50 |
| Density PCF | 2 | 2.14 | 1.92 | 1.95 | 2.08 | 2.42 | 1.98 | 2.06 | 2.2 |
| K-Factor Btu.in hr.ft$^2$-F.° | 0.110 | 0.107 | 0.116 | 0.112 | 0.111 | 0.113 | 0.108 | 0.105 | 0.106 |

Although the invention has been described in detail in the foregoing for the purpose of illustration, it is to be understood that such detail is solely for the purpose and that variations can be made therein by those skilled in the art without departing from the spirit and scope of the invention except as it may be limited by the claims.

What is claimed is:

1. A closed cell, rigid polymer foam which comprises the reaction product of a polyisocyanate and an isocyanate-reactive compound in the presence of
   a) from 5.0 to 20.0% by weight of dichlorofluoroethane,
   b) from 0.1 to 5.0% by weight of a fluorinated blowing agent selected from the group consisting of
      i) perfluorinated aliphatic and cycloaliphatic hydrocarbons,
      ii) perfluorinated N-aliphatic, cyclic 1,3-or 1,4-amino ethers,
      iii) perfluorinated ethers,
      iv) perfluorinated tertiary alkylamines, and
   c) from 0.1 to 12% by weight of carbon black, with all of the percents by weight being based upon the total weight of the foam.

2. The foam of claim 1, wherein component a) is used in an amount of from 8 to 17% by weight, component b) is used in amount of from 1 to 3% by weight and component c) is used in an amount of from 4 to 8% by weight.

* * * * *